US011546335B2

(12) United States Patent
Jain et al.

(10) Patent No.: US 11,546,335 B2
(45) Date of Patent: Jan. 3, 2023

(54) MANAGING PERMISSIONS TO CLOUD-BASED RESOURCES WITH SESSION-SPECIFIC ATTRIBUTES

(71) Applicant: Amazon Technologies, Inc., Seattle, WA (US)

(72) Inventors: Rachit Jain, Bothell, WA (US); Sulay Shah, Seattle, WA (US); Conor Cahill, Seattle, WA (US); Praveen Akinapally, Seattle, WA (US); Ian Leung, Seattle, WA (US); Rohit Raj, Seattle, WA (US); Brigid Johnson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 16/586,742

(22) Filed: Sep. 27, 2019

(65) Prior Publication Data
US 2021/0099450 A1    Apr. 1, 2021

(51) Int. Cl.
*H04L 29/06* (2006.01)
*H04L 9/40* (2022.01)
*G06F 16/182* (2019.01)

(52) U.S. Cl.
CPC .......... *H04L 63/101* (2013.01); *G06F 16/182* (2019.01); *H04L 63/0435* (2013.01); *H04L 63/0823* (2013.01)

(58) Field of Classification Search
CPC ............... H04L 63/101; H04L 63/0435; H04L 63/0823; G06F 16/182
See application file for complete search history.

(56) References Cited

U.S. PATENT DOCUMENTS

| 8,402,514 | B1* | 3/2013 | Thompson | H04L 63/08 |
| | | | | 726/4 |
| 9,729,539 | B1* | 8/2017 | Agrawal | H04L 63/0815 |
| 9,894,067 | B1* | 2/2018 | Mandadi | H04L 63/0807 |
| 9,923,927 | B1* | 3/2018 | McClintock | H04L 63/0846 |
| 10,536,277 | B1* | 1/2020 | Kruse | G06F 12/1408 |

(Continued)

OTHER PUBLICATIONS

Nicolas Ferry et al., Managing multi-cloud systems with CloudMF, Sep. 2013, ACM, pp. 38-45. (Year: 2013).*

(Continued)

*Primary Examiner* — Luu T Pham
*Assistant Examiner* — Fahimeh Mohammadi
(74) *Attorney, Agent, or Firm* — Nicholson De Vos Webster & Elliott LLP

(57) ABSTRACT

Techniques for managing permissions to cloud-based resources with session-specific attributes are described. A first request to create a first session to permit access to resources of a provider network is received under an assumed role. The first request is permitted based on an evaluation of a rule associated with the role. Session data including a user-specified attribute included with the first request is generated. A second request to perform an action with a resource hosted by the provider network is received. The user-specified attribute is obtained from the session data based at least in part on the second request. The second request is permitted based on an evaluation of another rule with the user-specified attribute.

17 Claims, 10 Drawing Sheets

(56) References Cited

U.S. PATENT DOCUMENTS

| | | | |
|---|---|---|---|
| 2002/0124088 A1* | 9/2002 | Sato | H04L 41/0886 709/227 |
| 2012/0204248 A1* | 8/2012 | Gonzalez | H04L 63/105 726/8 |
| 2013/0047228 A1* | 2/2013 | Radhakrishnan | G06F 21/335 726/7 |
| 2014/0172854 A1* | 6/2014 | Huang | G06F 21/6245 707/737 |
| 2014/0189808 A1* | 7/2014 | Mahaffey | H04L 63/083 726/4 |
| 2014/0196104 A1* | 7/2014 | Chari | H04L 63/102 726/1 |
| 2014/0282889 A1 | 9/2014 | Ishaya et al. | |
| 2017/0070498 A1* | 3/2017 | Fork | H04L 63/083 |
| 2017/0118218 A1* | 4/2017 | Koottayi | H04L 63/102 |
| 2018/0159810 A1* | 6/2018 | Buchheit | H04L 51/216 |
| 2019/0014102 A1* | 1/2019 | Mathew | G06F 21/41 |

OTHER PUBLICATIONS

Shashank Shekhar et al., Dynamic Resource Management Across Cloud-Edge Resources for Performance-Sensitive Applications, May 2017, ACM, pp. 707-710. (Year: 2017).*

Nayden Markatchev et al., A Cloud-based Interactive Application Service, Jan. 15, 2010, IEEE, pp. 102-109. (Year: 2010).*

Leila Karimi et al., An Unsupervised Learning Based Approach for Mining Attribute Based Access Control Policies, Jan. 24, 2019, IEEE, pp. 1427-1436. (Year: 2019).*

International Search Report and Written Opinion, PCT/US2020/048356, dated Oct. 29, 2020, 13 pages.

International Preliminary Report on Patentability, PCT/US2020/048356, dated Apr. 7, 2022, 9 pages.

Office Action, EP App. No. 20768811.0, dated Aug. 19, 2022, 7 pages.

* cited by examiner

```
EXAMPLE ROLE TRUST POLICY 200
{
  "Version": "2019-09-16",
  "Statement": [
    {
      "Effect": "Allow",
      "Principal": {
        "AWS": "arn:aws:iam::977480730452:user/JaneDoe"
      },
      "Action": ["sts:AssumeRole", "sts:TagSession"],  ──── ACTIONS SUBJECT TO
      "Condition": {                                         CONDITION 205
        "StringLike": {
          "aws:RequestTag/Department": "*",  ──────────── REQUIRED TAG KEYS
          "aws:RequestTag/CostCenter": [                    210
            "1234",
            "5678"
          ]
        },
        "ForAllValues:StringEquals": {
          "aws:TagKeys": [            ──────────────────── PERMITTED TAG KEYS
            "CostCenter",                                   210
            "Department",
            "CertificationX"
          ]
        }
      }
    }
  ]
}
```

REQUIRED TAG VALUE 212

FIG. 2

EXAMPLE ROLE TRUST POLICY 300

```
{
    "Version": "2019-09-16",
    "Statement": [
        {
            "Effect": "Allow",
            "Principal": {
                "AWS": "arn:aws:iam::977480730452:user/JaneDoe"
            },
            "Action": ["sts:AssumeRole", "sts:TagSession"],
            "Condition":
            {
                "ForAllValues:StringNotEquals": {        ┐ PROHIBITED TAGS 310
                    "aws:TagKeys":"Project"
                }
            }
        }
    ]
}
```

FIG. 3

MANAGING PERMISSIONS TO CLOUD-BASED RESOURCES WITH SESSION-SPECIFIC ATTRIBUTES

BACKGROUND

Business of all types often face computing security challenges such as managing who has access to what. For example, certain users (e.g., users, applications, etc.) might have access to certain resources (e.g., computers, applications, databases, etc.) but not others. Information Technology ("IT") personnel often manage access control. As the size and complexity of organizations grow, managing access control can become a significant and complex effort. Users joining and/or leaving the organization, moving between projects or teams, deploying software applications, etc. creates a continually changing environment, and typical hands-on access management approaches often fail to scale. Further compounding the complexity of access control is the rise of cloud-based computing—now IT personal need to manage both access control to computing resources of their own enterprise as well to cloud-based computing resources.

BRIEF DESCRIPTION OF DRAWINGS

Various embodiments in accordance with the present disclosure will be described with reference to the following drawings.

FIG. 2 is an exemplary role trust policy according to some embodiments.

FIG. 3 is another exemplary role trust policy according to some embodiments.

DETAILED DESCRIPTION

Figure 1:
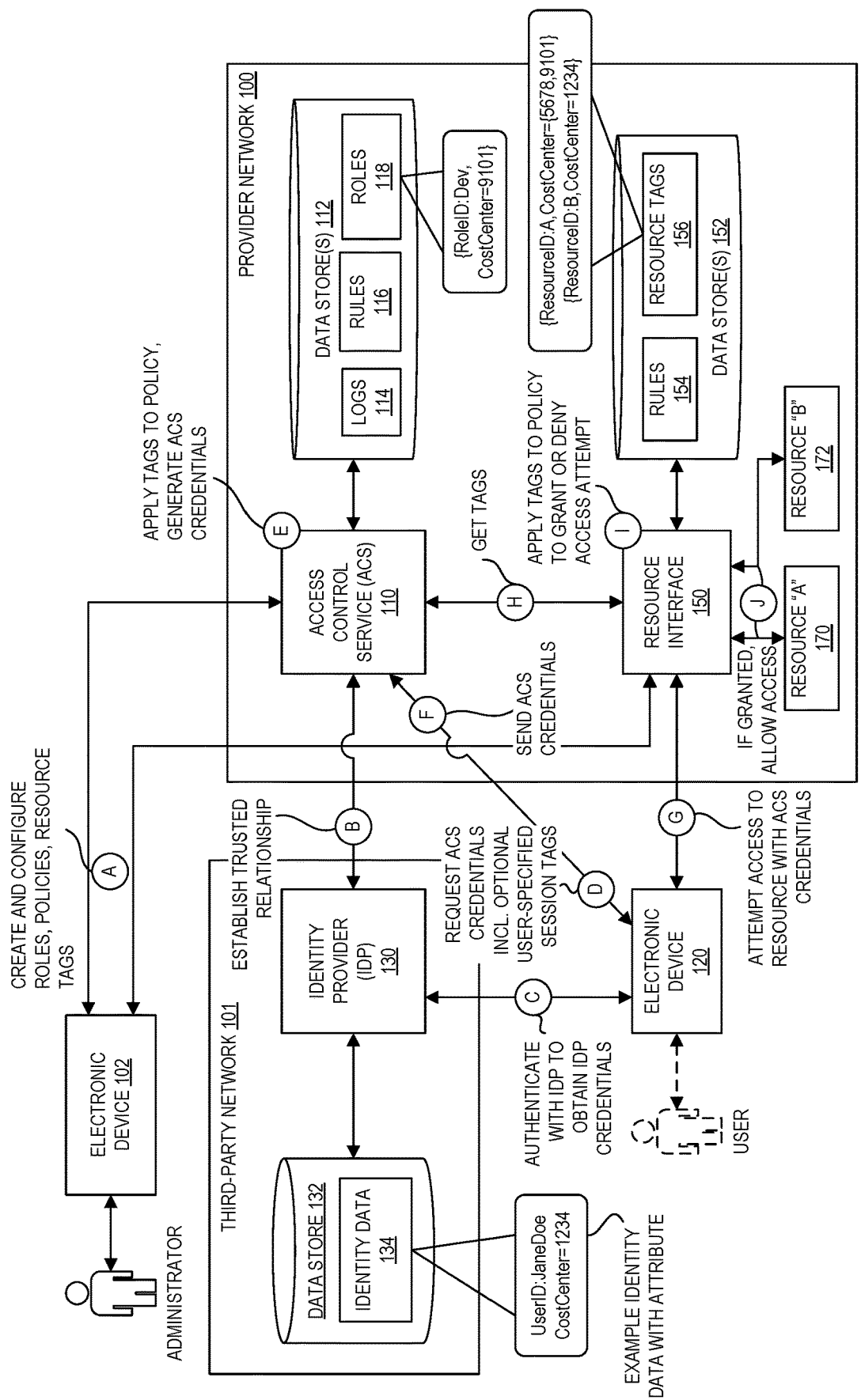
FIG. 1 is a diagram illustrating an exemplary environment for managing permissions to cloud-based resources with session-specific attributes according to some embodiments.

The present disclosure relates to methods, apparatus, systems, and non-transitory computer-readable storage media for managing permissions to cloud-based resources with session-specific attributes. Techniques described herein provide a simpler way to manage permissions at scale by relying on attributes of entities making access requests and of resources to which access is requested. Previously, managing fine-grained permissions to cloud-based resources for a large number of users in an organization was challenging. Entities could assume a role to gain access to the various resources permitted by that role. For example, a software developer might assume a developer role to gain access to cloud-based computing resources on which to develop and deploy software applications. In order to tailor permissions to individual users, IT personnel such as administrators were forced to create multiple roles. When administrators created a role for each user in their organization, they ended up with many roles which increased permissions management complexity. Alternatively, when they used one role per group (e.g., organizational groups, project groups, etc.), users that were a part of multiple groups had to assume different roles as they performed different tasks. This was time consuming and created friction for using cloud-based resources particularly when users worked on multiple projects simultaneously. Additionally, tracking activity back to an individual user required multiple steps. For example, an administrator trying to determine who performed some action might have to scan logs to look for the action, identify the session in which the activity occurred, search for the role that was assume for that session, and locate which group was aligned to the role. This made it difficult for the security administrator to determine who performed an action.

Aspects of the present disclosure address the above and other challenges by evaluating attribute-based rules that determine whether to grant access to a particular resource of a provider network with attributes included with a session request. In some embodiments, entities such as users or applications establish a session with an access control service of the provider network in order to access other provider-network resources. As part of establishing a session, entities can assume a particular role that has zero or more pre-defined attributes (also referred to herein as "tags"). Assumption of the role can be contingent on a set of one or more role trust rules associated with the role that govern whether an entity can assume the role. Additionally, the entity may be able to override existing attributes or to specify additional attributes when assuming a role, subject to the set of role trust rules. In some embodiments, the set of role trust rules are part of a role trust policy. The tags—whether pre-defined or specified upon assumption of the role—can be stored as part of session data. In addition to tags, the session data can include other metadata identifying the entity's session with the provider network (e.g., the session role, any session-specific policies, etc.). Tags or attributes are also applied to resources of the provider network. For example, a certain computing resource might have a given cost center. An entity is granted or denied access to a resource based on an evaluation of the tag(s) of the resource and the tag(s) of the entity's session against a set of one or more role permission rules that govern what actions or operations the role can initiate or perform using resources. For example, the set of one or more role permission rules may specify that access to a certain resource is only permitted to sessions tagged with a cost center that matches the cost center of the resource. In some embodiments, the set of role permission rules are part of a role permissions policy.

By allowing entities to change tags during session establishment with the provider network, those entities can customize their session without requiring an administrator to create and maintain many different roles to control access to resources. For example, an administrator could create a single developer role that allows the specification of a project tag and tag various resources with their associated project(s). For example, a first resource might be allocated to entities associated with the projects "Blue" and "Green," a second resource might be allocated to only entities associated with the project "Green," and a third resource might be allocated to only entities associated with the project "Red." When an entity assumes that role, the entity can specify a session-specific project tag that identifies one or more projects. For example, the entity may specify that it is part of projects "Blue" and "Red" to gain access to both the first and the third resources using a single role. In this manner, both the number of roles an administrator would need to manage and the number of different roles an entity would have to assume during daily activities would be reduced. Reducing the number of roles reduces the complexity and effort of access management.

FIG. 1 is a diagram illustrating an exemplary environment for managing permissions to cloud-based resources with session-specific attributes according to some embodiments. The exemplary environment includes a provider network 100. The provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

The provider network includes an access control service (ACS) 110 and a resource interface 150 through which an entity such as a user or application can issue actions or operations to cloud-based resources such as resources 170 and 172. The ACS 110 can be one or more software applications or programs executed by the processors of one or more computer systems of the provider network 100. Likewise, the resource interface 150 can be one or more software applications or programs executed by the processors of one or more computer systems of the provider network 100.

The ACS 110 can provide identity and access management (IAM) for the provider network 100 such as through ACS frontend components that authenticate users and manage sessions with resources of the provider network or ACS backend components that provide session-specific information to other components of the provider network. For example, a user can authenticate with the provider network 100 through the ACS 110 via an interface (not shown) such as an SSH-command-line interface, a console implemented as a website or application, an application programming interface (API), etc.

The resource interface 150 can control access to particular resources of the provider network. For example, a resource interface to a storage virtualization service can control access to various virtualized data stores of the provider network 100 while a resource interface to a hardware virtualization service of the provider network 100 can control access to various virtualized compute instances of the provider network 100. The resource interface 150 may be implemented as a gateway an SSH-command-line interface, a console implemented as a website or application, an application programming interface (API), etc.

An exemplary set of operations for managing permissions to resources 170, 172 with session-specific attributes is now described with reference to the encircled letters A through J.

As indicated at circle A, an administrator operating an electronic device 102 can create and configure roles and policies, and can set resource attributes (the act of adding or setting an attribute or tag is also referred to as "tagging"). A role is an identity created with the ACS 110 that can have zero or more tags. The role can have an associated set of one or more role trust rules that governs which entities may assume the role. The role can also have an associated set of one or more role permissions rules that governs which actions or operations the role can initiate or perform using certain resources. Both role trust and role permissions rules can be specified using, for example, a structured data format such as JavaScript Object Notation (JSON). In some embodiments, the role trust and/or role permissions rules are specified as policies. Exemplary policies are provided in FIGS. 2-4.

Tags—whether associated with a user, a role, a session, or a resource—can be a standalone key or a key-value pair. Exemplary tags can include an organization name, role, certifications, security group, username, manager's name, project name(s), team name(s), etc. For example, a role might be tagged with a "Project=Blue" key-value pair indicating the role is used for the project with the codename blue. A session might be tagged with a "CertificateX" key indicating that the entity creating the session has a certain certificate. A resource might be tagged with "CostCenter=1234,5678" indicating the resource can be used by entities in either cost center 1234 or 5678.

The administrator creates roles and role trust rules or policies. In this example, the administrator creates a developer or "Dev" role object with the ACS 110 having a default or pre-defined tag "CostCenter=1234". The ACS 110 updates roles data 118 in a data store 112 with the newly created object, as shown. The administrator also creates and defines a set of one or more role trust rules with the ACS 110 and associates those role trust rules with the developer role object. For example, the administrator can send via electronic device 102 a role trust policy that includes a set of one or more role trust rules and identifies one or more roles to which those rules apply to the ACS 110. The ACS 110 updates the role trust rules data 116 with the role trust rules and, in some embodiments, updates metadata (not shown) in the data store 112 to associate the role trust rules with the developer role object in the roles data 118.

The administrator also adds tags to resources and creates role permissions rules. In this example, the administrator adds "CostCenter" tags to resources 170 and 172. Here, the administrator tags resource "A" 170 with "CostCenter={15678,9101}" and resource "B" 172 with "CostCenter=1234" via the resource interface 150. The resource interface 150 updates resource tags data 156 with the tags, as illustrated. The administrator also creates and defines role permissions rules with the resource interface 150 and associates those rules with a particular resource. For example, the administrator can send via electronic device 102 a role permissions policy that includes a set of one or more role permissions rules and identifies one or more resources to which those rules apply to the resource interface 150. The resource interface 150 updates the role permissions rules data 154 with the rules and, in some embodiments, updates metadata (not shown) in the data store 152 to associate the role permissions rules with the particular resource(s).

In the illustrated embodiment, an identity provider (IDP) 130 performs user authentication for the provider network 100 via a federated model using a model such as the OpenID Connect (OIDC) model, the Security Assertion Markup Language (SAML) model, etc. For example, the IDP 130 may be Microsoft Active Directory deployed within an organization (e.g., as a service of a third party-network 101). Accordingly, the administrator can also provide metadata describing the IDP 130 to the ACS 110 such as cryptographic and address information to allow the ACS 110 and the DIP 130 to establish a trusted relation, as indicated at circle B. In this manner, the IDP 130 can authenticate users and, because the ACS 110 trusts the IDP 130, the IDP 130 can serve as a source of authentication of users to the ACS 110.

Users authenticate with the IDP 130 using, e.g., a username and password, multi-factor authentication, etc. Users within the IDP 130 can be stored as identity data 134 within a data store 132. In this example, the identity data 134 can include attributes for user objects, here, for example, a user object has a UserID attribute with a value of "JaneDoe" and a CostCenter attribute with a value of "1234".

As indicated at circle C, the user authenticates with the IDP 130 and in response receives credentials from the IDP (referred to herein as IDP credentials). Exemplary IDP credentials include a SAML assertion or an OpenID Connect ID token. In some embodiments, the IDP credentials are protected to prevent tampering by the user (e.g., signed or encrypted by the IDP 130 so the ACS 110 can verify or decrypt the IDP credentials using a public key in communications at circle B). In some embodiments, the IDP credentials include one or more of the attributes associated with the user in the identity data 134. For example, the IDP credentials upon the successful login of Jane Doe can include a "UserID=JaneDoe" key-value pair and a "CostCenter=1234" key-value pair. In other embodiments, all of the attributes associated with the user in the identity data 134 are included in the IDP credentials. In yet other embodiments, some subset of the attributes associated with the user in the identity data 134 are included in the IDP credentials as negotiated between the IDP 130 and the ACS 110. For example, the ACS 110 can indicate to the ICS 130 that all IDP credentials include the CostCenter attribute.

As indicated at circle D, the entity controlling an electronic device 120—whether a user or application—can request credentials from the ACS 110 (referred to herein as ACS credentials). ACS credentials can be temporary session credentials that include an identifier that identifies the session, a secret access key that the entity can use to sign requests submitted during the session, and a token that includes the session data. The session data can include metadata identifying the entity's session with the provider network (e.g., the session role, any session-specific policies, etc.). In some embodiments, the request is an API call to the ACS 110 to return ACS credentials for a session with the provider network 100 using an assumed role. The API can accept the IDP credential, an identifier of the role to assume for the session, and zero or more user-specified session tags (e.g., user-specified attributes). The user-specified session tags can be used to supplement and/or replace attributes embedded within the IDP credential or default attributes as determined by the role trust rules. The entity can specify additional tags not present in the IDP credentials (e.g., the entity can specify a "Department=Sales" tag, specify additional tags that are present in the IDP credentials or to overwrite the value of a tag that exists in the IDP credentials. Note that the electronic device 120 may be connected to the third-party network 101 or the provider network 100.

As indicated at circle E, the ACS 110 evaluates tags—whether attributes from the identity data 134 embedded within the IDP credential or as specified by the user—against the role trust rules associated with the role identified in the ACS credentials request to determine whether to grant the request. Again, the role trust rules govern which entities may assume the role. For example, the role trust rules can indicate which tags must be included with the request, what values those tags must have if the role is to be assumed (e.g., "RoleID" must equal "Developer"), whether any of the tags cannot be user-specified. Additionally, the role trust rules can specify whether to replace or supplement default tags associated with a role or IDP attributes with user-specified tags and/or whether to replace or supplement default tags associated with a role with IDP attributes.

For example, if the role trust rules require certain attributes and, possible, those attributes to have certain values, but the request does not include such an attribute or an attribute with those values, the ACS 110 can deny the request for ACS credentials. This is illustrated in the exemplary role trust policy 200 of FIG. 2. In particular, in order for an entity to assume a role as specified by the AssumeRole action 205, the request must include tags for CostCenter and Department as specified by the required tag keys 210 parameter. Additionally, the value of the CostCenter attribute must be either "1234" or "5678" as further specified by the required tag values 212 for the CostCenter (note that the Department tag can have any value as indicated by the "*"). Also illustrated in FIG. 2 is a rule permitting certain tags to be submitted as part of the AssumeRole action request with the TagSession action 205. In particular, the permitted tag keys 205 allow the CostCenter, Department, and a "CertificationX" tags or attributes to be submitted.

As yet another example, the role trust rules can prohibit certain attributes from being submitted (whether simply not specified at all or not submitted as a user-specified attribute that would override a value in a secure IDP credential). In such a case, if the attribute is included, the ACS 110 can deny the request for ACS credentials. This is illustrated in the exemplary role trust policy 300 of FIG. 3. Again, with reference to a TagSession action, a Project tag cannot be submitted as specified by the prohibit tags 310 parameter (e.g., due to the StringNotEquals condition).

The ACS 110 can log the attributes or tags associated with each request in the logs data 114. In this manner, administrators can more readily identify user activity by logging identity attributes by viewing the attributes set for the entity in the logs data 114.

Returning to FIG. 1, assuming the request for ACS credentials passes the role trust rules, the ACS 110 generates the ACS credentials. As part of generating the ACS credentials, the ACS 110 can include session attributes (whether originating as default tags, in the IDP credential, and/or as user-specified attributes) in the session data. For example, if the user was permitted to specify an attribute, the attribute was also included in the IDP credentials, and a rule indicated that the user-specified attribute replaces a default attribute, the ACS 110 can include the user-specified attribute and omit the corresponding attribute from the IDP credentials (e.g., if the IDP credentials indicated a CostCenter attribute of "1234" but the user specified a CostCenter tag of "5678," the ACS 110 can include "CostCenter=5678" in the session data). Additionally, the ACS 110 can include any attributes from the ICS credentials that were not overwritten by user-specified attributes. Note that in some embodiments, the ACS can append user-specified attributes to other attributes (e.g., the user is associated with both cost centers "1234" and "5678") subject to whether the user-specified tag supplements or replaces the corresponding IDP tag as specified in the role trust rules. Furthermore, the ACS 110 can include default role tags with the session data when neither the attributes of the IDP credentials nor the user-specified attributes superseded those tags (or if those attributes supplemented the default tags). For example, the developer or "Dev" role object in the roles data 118 has a default or pre-defined tag "CostCenter=1234". If the IDP credentials did not include a CostCenter attribute, and the user in the request at circle D did not specify a CostCenter attribute, the ACS 110 can include the default CostCenter attribute from the roles data 118 in the returned session data.

As indicated at circle F, the ACS 110 sends the generated ACS credentials to the electronic device 120. In some embodiments, the session data, including any tags, is encrypted in a session token that is part of the ACS credentials and returned to the electronic device 120. In other embodiments, the ACS 110 can maintain the session data and return an identifier to the electronic device 120 (e.g., the identifier that identifies the session). The entity controlling the electronic device 120 can later reference that identifier in subsequent requests to allow the ACS to locate the maintained session data. An example of this latter approach is provided in FIG. 5.

It is noted that the illustrated sequence of communications to obtain the ACS credentials is merely exemplary in nature and that a variety of other communications flows can be used to provide the IDP-defined attributes and any user-specified attributes to the ACS 110. For example, the IDP 130 can provide the IDP credentials to the ACS 110 after authentication of the user rather than rely on the user to relay the IDP credentials to the ACS 110 (at circles C and D). The user can then separately send various user-specified attributes as part of a request for ACS credentials. As another example, the user can include user-specified attributes when initiating a login with the ACS 110 or attempting to access a resource of the provider network 100. The ACS 110 or resource interface 150 can respectively redirect the login or access attempt to the IDP 130 in order to obtain the IDP credential, and subsequently provide the ACS credential to the user.

As indicated at circle G, the entity controlling the electronic device 120 can attempt to access a resource of the provider network 100 such as the resource "A" 170 or the resource "B" 172 via the associated resource interface 150, which again may be an API. Such an access could be an action or operation to be carried out by a resource, such as a request to terminate or restart a virtualized compute instance, query a database instance, retrieve an object from a virtualized storage resource, etc. In addition to specifying the action or operation, the request includes or makes reference to the at least a portion of the ACS credentials that can be used to authenticate the requestor. For example, the request can include the token that contains the session data.

As indicated at circle H, the resource interface 150 gets the tags in the session data from the ACS 110. For example, the resource interface 150 can pass the token received with the request at circle G to the ACS 110. The ACS 110 can extract the tags from the token—whether originating from the ICS credentials, with the request at circle D, or as a default tag to the role—and return the tags to the resource interface 150. For example, the ACS 110 can maintain the key used to encrypt and decrypt the token in the data store 112 (not shown). The resource interface 150 can also pass the identifier that identifies the session to which the token is associated to the ACS 110. The ACS 110 can use the identifier to locate the key, decrypt the token, and return the tags to the resource interface 150.

As indicated at circle I, the resource interface 150 evaluates the tags associated with session and the tags associated with the resource in the resource tags data 156 against a role permissions rules in the role permissions rules data 154 to determine whether to grant or deny the access attempt. The role permissions rules can indicate which tags must match between the ACS credentials match a corresponding tag associated with a resource in the resource tags data 156. This is illustrated in the exemplary role permissions policy 400 of FIG. 4. In particular, the example role permissions policy 400 includes a rule for a first "DescribeInstances" action permitted by any session as specified by the rule without conditions 405. Additionally, the example role permissions policy 400 includes a rule for "StartInstances" and "StopInstances" actions that is subject to certain conditions as specified by the rule with conditions 410. In particular, the "StartInstances" and "StopInstances" actions are permitted when the "ResourceTags" CostCenter and Project as specified by the tags associated with a resource 415 match the respective "PrincipalTags" (e.g., tags attribute to the entity for the session) as specified by the tags associated with the session 420. Again, such PrincipalTags can originate from the from the ICS credentials, as a user-specified tag with the request at circle D, or as a default tag to the role.

Returning to FIG. 1, assume that a simple role permissions policy permitted all actions contingent on a match between the CostCenter tagged to the resource and the CostCenter tagged to the session. If the ACS credentials included the CostCenter attribute "9101" from the default CostCenter attribute associated with the developer role because the CostCenter was not included in the IDP credentials and not specified by the user, the resource interface 150 would deny an access request to resource "B" 172 but grant a request to resource "A" 170 because "9101" matched the CostCenter tag of the resource "A" 170 in the resource tags data 156. If the ACS credentials included the CostCenter attribute "1234" from the IDP credentials, the resource interface 150 would deny an access request to resource "A" 170 but grant a request to resource "B" 172 because "1234" matched the CostCenter tag of the resource "B" 170 in the resource tags data 156. If the ACS credentials included the CostCenter attribute "5678" from a user-specified tag, the resource interface 150 would deny an access request to resource "B" 172 but grant a request to resource "A" 170 because "5678" matched the CostCenter tag of the resource "A" 170 in the resource tags data 156.

Note that in some embodiments, the various tags can be multi-valued (e.g., a key and multiple values) such as shown for the CostCenter tag of resource "A" 170. In such cases, the role permission rules can require an intersection between the ResourceTags and PrincipalTags. For example, a shared resource might be used by teams working on projects "Green" and "Blue" and tagged with a ResourceTag "CostCenter=Green,Blue." Likewise, a user might work on projects "Blue" and "Red," so the PrincipalTag attributed to an entity for a session can specify "CostCenter=Blue,Red." In evaluating the role permissions rules, the resource interface 150 can determine that at least one of the CostCenter attributes matched between the ResourceTag and the PrincipalTag (i.e., "Blue"), and permit the request.

Figure 4:
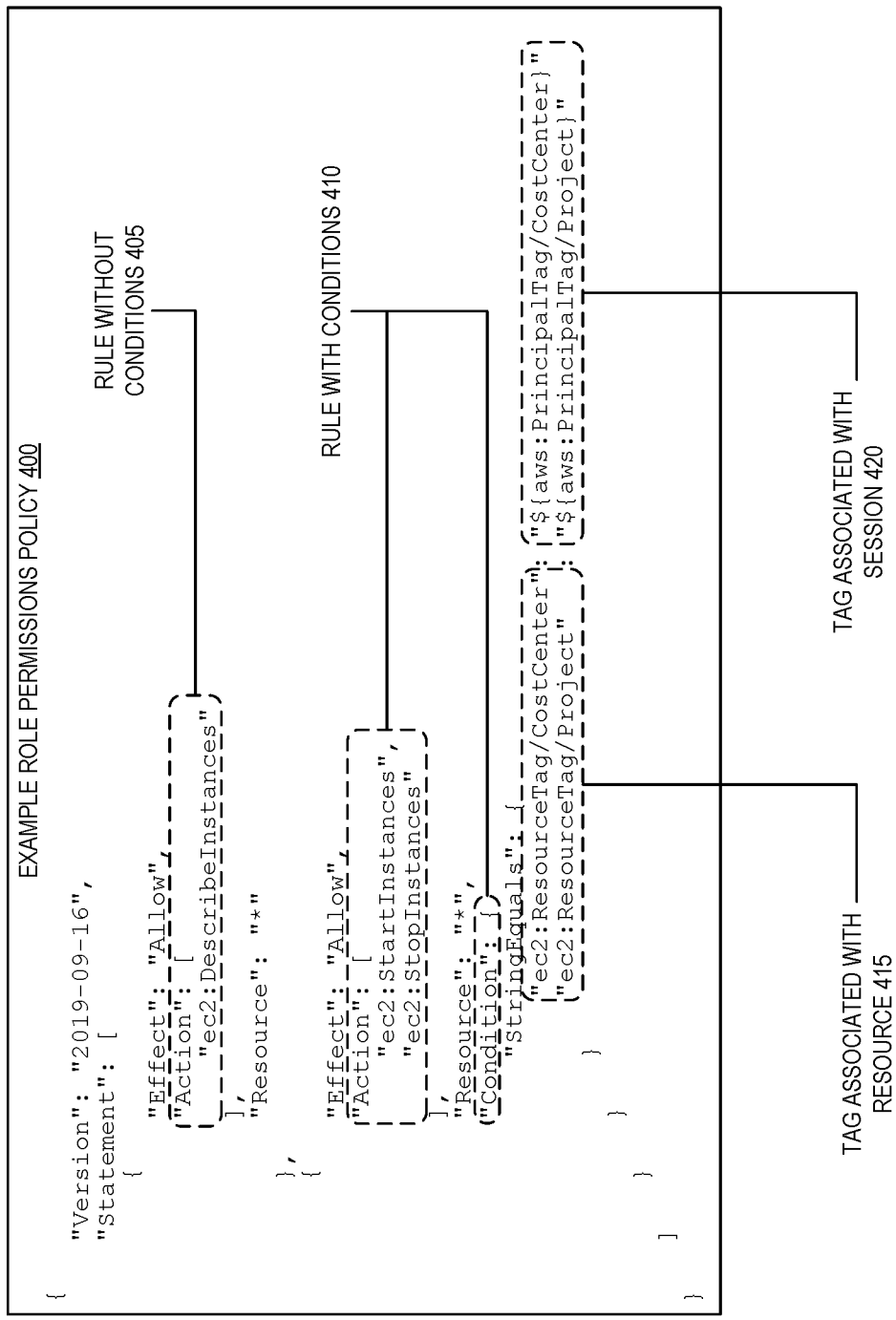
FIG. 4 is an exemplary role permissions policy according to some embodiments.

Generic rules such as those illustrated in FIG. 4 can be created and subsequently rely on user-specified session tags, tags can be attributed to resources, and tags can be attributed to the entity associated with a session (e.g., attributes created upon adding the user in the identity data 134, user-specified tags, and/or default tags associated with an assumed role). As a result, as the organization adds new resources in the provider network 100 and/or new users, administrators can continue to rely on the existing rules to manage user access to those resources without requiring any updated rules or roles.

As indicated at circle J, upon making a determination to grant the access attempt, the resource interface 150 can allow the request from the electronic device 120 to the permitted resource.

In some embodiments, the data stores 112, 132, 152 are implemented as one or more non-volatile memory devices (e.g., solid-state drives).

As noted above, the ACS 110 can also perform entity authentication rather than rely on federated authentication from the IDP 130 as illustrated in FIG. 1. In some embodiments, the ACS 110 authenticates entities via, e.g., a username and password, multi-factor authentication, etc. For example, the entity may be some other user unaffiliated with the organization maintaining the IDP 130 or have a separate account with the ACS 110, an application executing on a processor of the electronic device 120 (e.g., if the electronic device 120 is a computer system of the provider network 100), etc. Upon authenticating with the ACS 110, the entity may be given a role and subsequently assume a different role as described above with reference to circles D through F.

Figure 5:
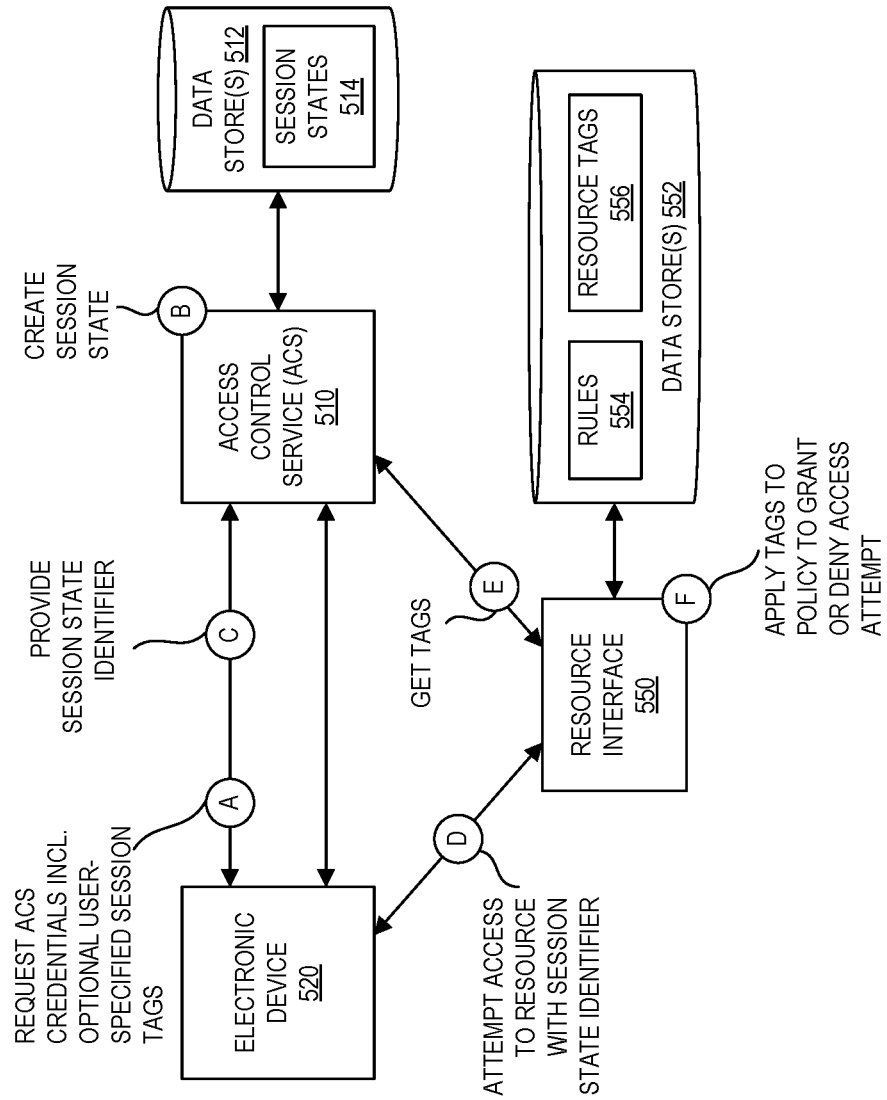
FIG. 5 is a diagram illustrating another technique for managing session-specific attributes according to some embodiments.

FIG. 5 is a diagram illustrating another technique for managing session-specific attributes according to some embodiments. As indicated at circle A, an electronic device 520 can request ACS credentials including optionally user-specified session tags from an ACS 510. Upon receipt of the request and verifying it against role trust rules, the ACS 510 can create a session state object and store the session state in the session states data 514 in a data store 512, as indicated at circle B. Like the session token, the session state object can include the various session data described above, such as tags and other metadata identifying the entity's session with the provider network. As indicated at circle C, the ACS 510 returns a session state identifier to the electronic device 520 that can be used to identify the session state object in the session states data 514. As indicated at circle D, the electronic device can attempt to access a resource via a resource interface 550, including the session state identifier with the request. As indicated at circle E, the resource interface 550 can retrieve the session tags from the ACS 510 by providing the ACS 510 with the session state identifier. The ACS 510 can fetch the tags from the session state object in the session states data 514 using the session state identifier and return the tags to the resource interface 550. Upon receipt of the tags, the resource interface evaluates the tags associated with session and the tags associated with the resource in the resource tags data 556 against role permissions rules in the role permissions rules data 554 to determine whether to grant or deny the access attempt. In this manner, session state data is stored by the ACS 510 rather than embedded within a session token passed to the electronic device 520.

Figure 6:
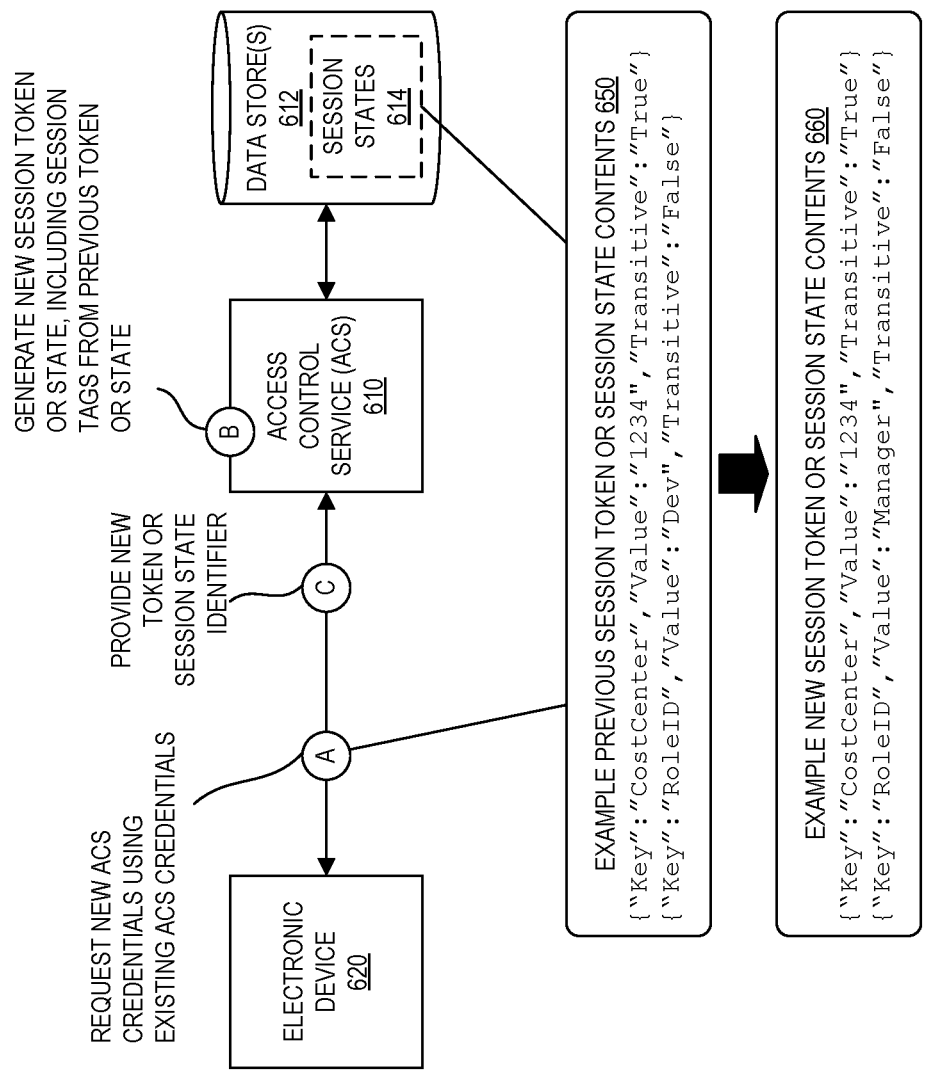
FIG. 6 is a diagram illustrating persisting session-specific tags across multiple roles according to some embodiments.

FIG. 6 is a diagram illustrating persisting certain tags across multiple roles according to some embodiments. In some scenarios, an entity may wish to assume a first role and then use that first role to assume a second role. For example, a user can establish a first session under the first role and obtain the ACS credentials for that session either by authenticating with an ACS 610 or by submitting IDP credentials, as described above. Once the user has obtained the ACS credentials for the first session, the user can request ACS credentials for a new session in which the user assumes a different role. As indicated at circle A, an electronic device 620 can request new ACS credentials using the existing ACS credentials from the first session. As indicated at circle B, the ACS 610 can generate a new session token or session state as described above. As indicated at circle C, the ACS 610 can then return the new token or the session state identifier to identify the new session state in the session states data 614 to the electronic device. As part of generating the new session data (whether contained in a session state object or session token), the ACS 610 can include some tags from the previous session data. For example, in some embodiments, the session data can include a parameter that indicates whether each tag in the session data can be inherited upon assumption of a new role. As shown, the session data in the previous session token or session state can include the example contents 650. The example contents 650 includes a CostCenter tag with a value of "1234" and a "RoleID" tag with a value of "Dev." The session data also includes a "Transitive" parameter to indicate whether the respective tag is transitive amongst sessions. The transitive parameter can be set when generating the original tag. For example, a session tag originating as a user-specified tag in the prior request (e.g., at circle D in FIG. 1 or circle A in FIG. 5) can be marked as transitive while other tags can be marked as not transitive. Upon receipt of the request for the new ACS credentials at circle A, the ACS can evaluate the contents of the previous session data to determine which tags to include in the new ACS credentials. Here, because the RoleID tag is not transitive, the new value is "Manager" (e.g., based on a default tag value associated with the new role). Additionally, because the CostCenter tag is transitive, the new value matches the old value of "1234," potentially overwriting a default tag value associated with the new role.

Figure 7:
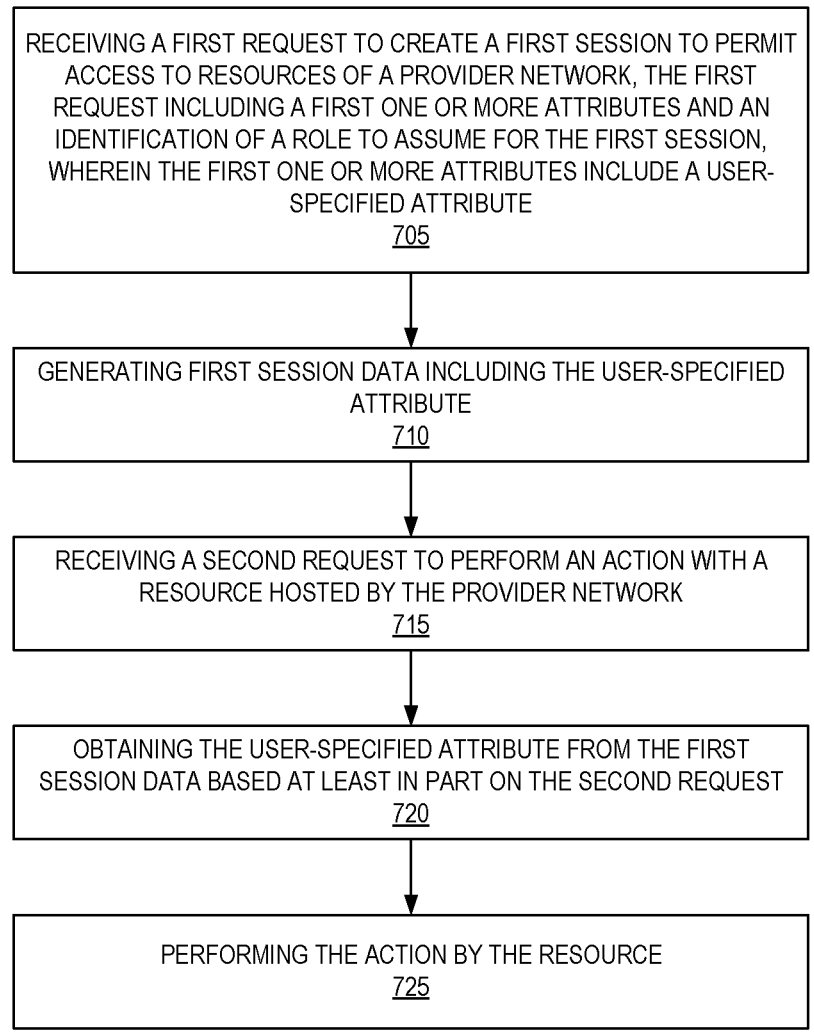
FIG. 7 is a flow diagram illustrating operations of a method for managing permissions to cloud-based resources with session-specific attributes according to some embodiments.

FIG. 7 is a flow diagram illustrating operations of a method for managing permissions to cloud-based resources with session-specific attributes according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the ACSs or the resource interfaces of the other figures.

The operations include, at block 705, receiving a first request to create a first session to permit access to resources of a provider network, the first request including a first one or more attributes and an identification of a role to assume for the first session, wherein the first one or more attributes include a user-specified attribute. For example, as described with reference to circle D of FIG. 1, the ACS 110 can receive a request for credentials (e.g., whether as part of a federated authentication model or otherwise). The request can include various attributes that can be used to tailor the created session such as user-specified tags or attributes and tags embedded within an IDP credential, if present. In some embodiments, the ACS 110 can evaluate one or more role trust rules with the attributes to determine whether to grant the first request.

The operations include, at block 710, generating first session data including the user-specified attribute. For example, as described with reference to circle E of FIG. 1, upon determining that the first request is permitted, the ACS 110 can generate session data. Such session data can include session-specific attributes originating from default role attributes, attributes embedded within an IDP credential, and/or attributes specified as part of the first request. Such session data can be stored within a token return to the requestor as described with reference to FIG. 1 or as part of session state data as described with reference to FIG. 5.

The operations include, at block 715, receiving a second request to perform an action with a resource hosted by the provider network. For example, as described with reference to circle G of FIG. 1, the resource interface 150 can receive a request to perform an action using or otherwise access a resource hosted by the provider network (e.g., virtualized data stores, virtualized machines, databases, etc.).

The operations include, at block 720, obtaining the user-specified attribute from the first session data based at least in part on the second request. For example, as described with reference to circle H of FIG. 1, the resource interface 150 obtains those session-specific attributes or tags in the session data from the ACS 110. As described herein, the ACS 110 can obtain those attributes by extracting them from a token or fetching them from session state data. In some embodiments, the resource interface 150 can evaluate one or more role permissions rules with the obtained user-specified attribute to determine whether to grant the second request.

The operations include, at block 725, performing the action by the resource. For example, if resource "A" 170 was a database and the second request was to query the database, resource "A" could receive and process the query and return the result.

Figure 8:
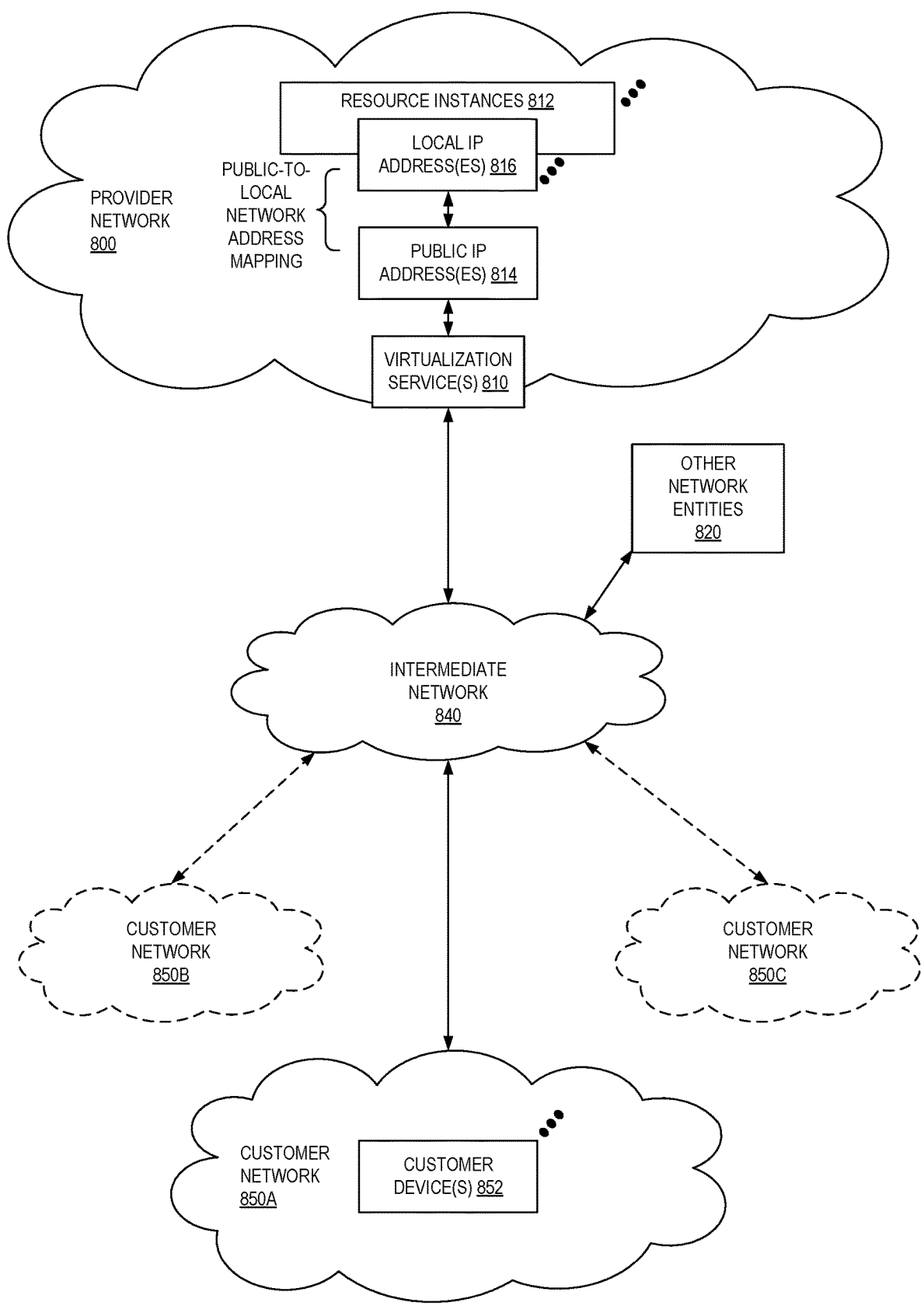
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
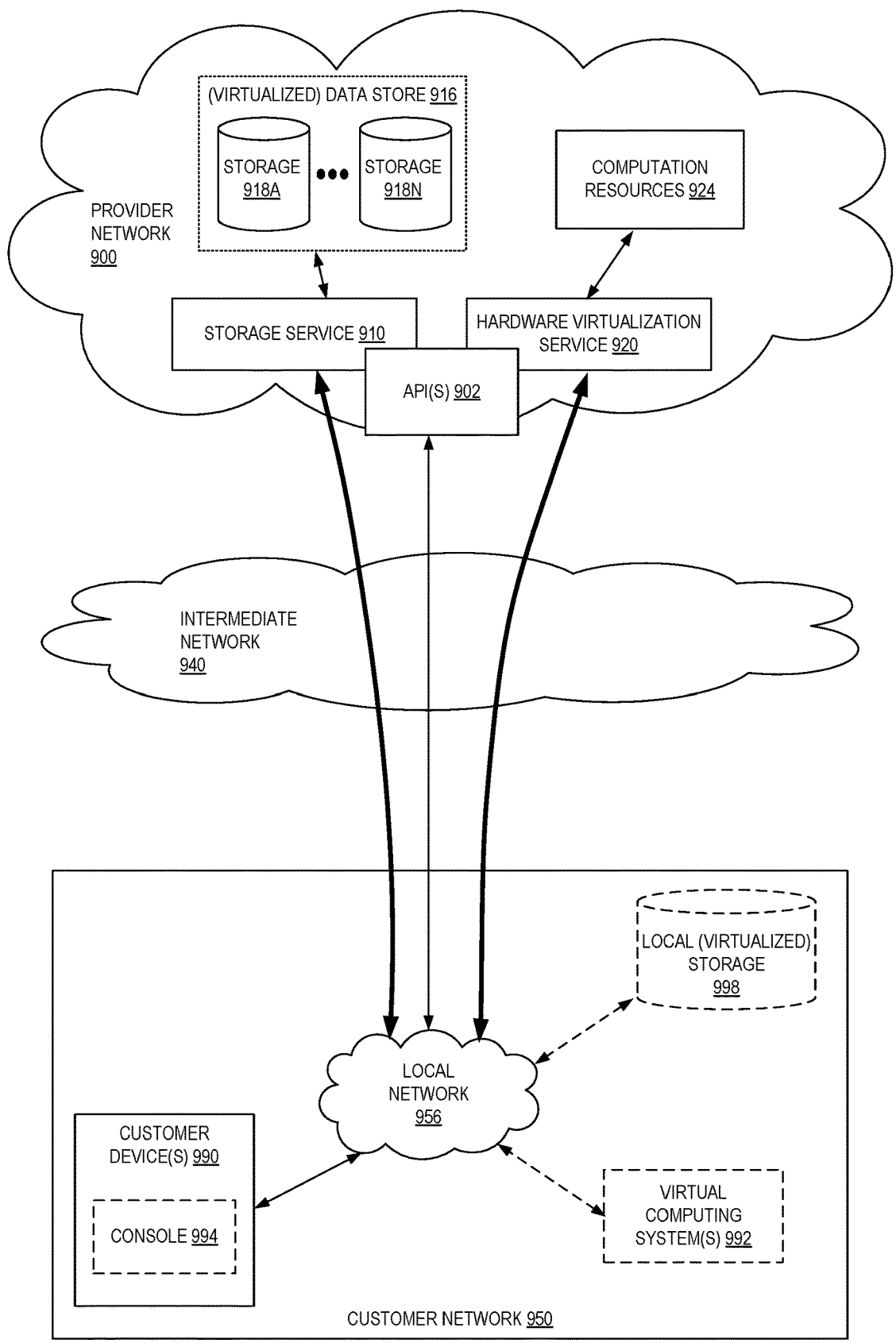
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
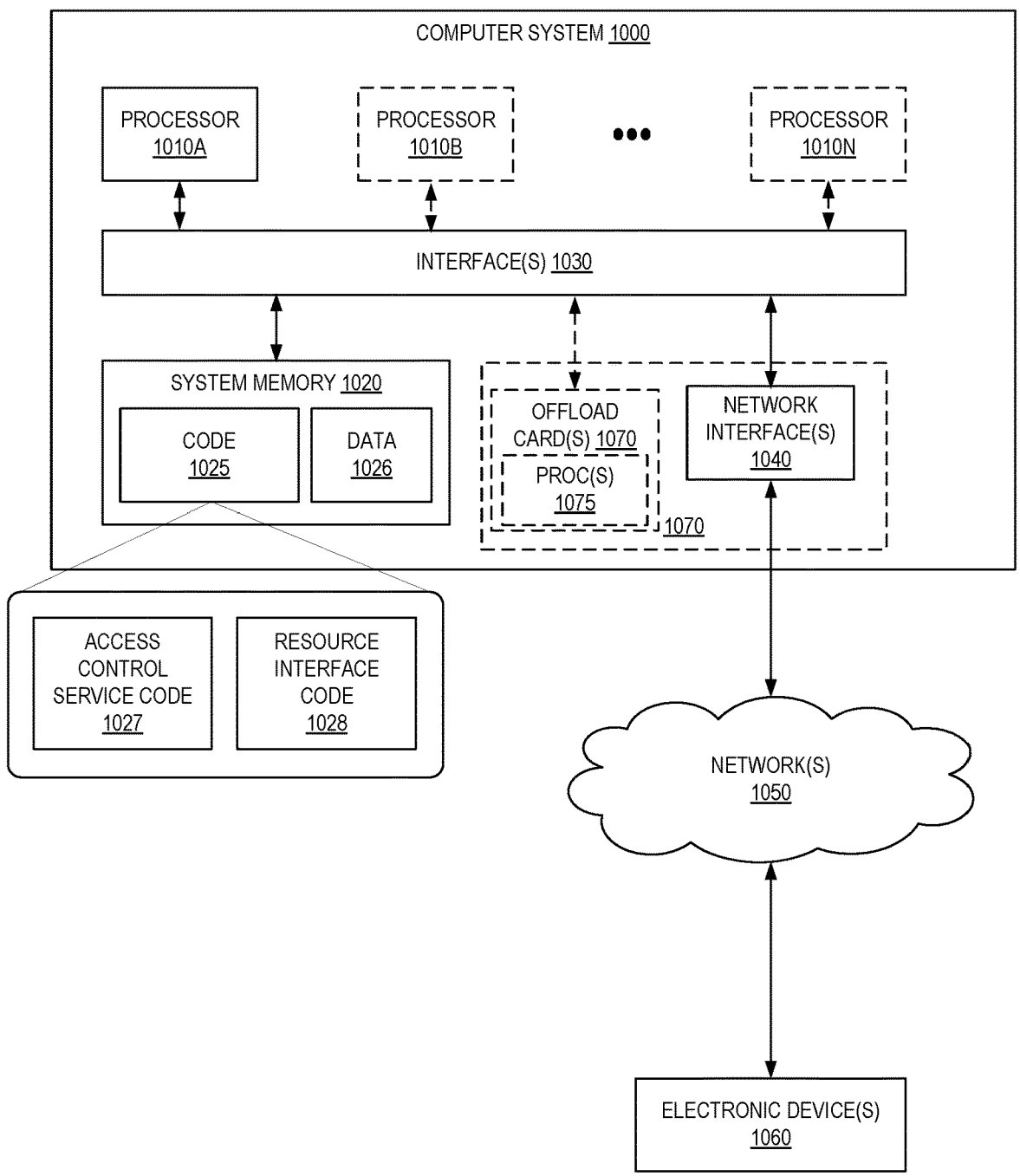
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 and data 1026. Code 1025 can include ACS code 1027 to implement the ACS (e.g., ACS 110, ACS 510, ACS 610) and resource interface code 1028 to implement a resource interface (e.g., resource interface 150, resource interface 550).

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at an access control service of a provider network, a first request to create a session with the provider network from an electronic device, the first request including a first one or more attributes and an identification of a role to assume for the session, wherein the first one or more attributes include a user-specified session tag to affect resource permissions of the session with the provider network;
permitting the first request based at least in part on an evaluation of a first rule with at least one attribute of the first one or more attributes, wherein the first rule governs whether the role can be assumed;
generating session data including the user-specified session tag, wherein generating session data includes replacing a value of another attribute with a value of the user-specified session tag, wherein the other attribute is at least one of a first attribute specified in an identity provider credential included with the first request or a second attribute associated with the role via a role object stored in the provider network, and wherein the user-specified session tag and the other attribute share a key name;
sending the session data to the electronic device;
receiving, at a resource interface, a second request to access a resource hosted by the provider network, the second request including the session data;
obtaining the user-specified session tag from the session data received in the second request; and
permitting the second request based at least in part on evaluation of a second rule with at least the user-specified session tag obtained from the session data received in the second request, wherein the second rule governs whether the resource can be accessed.

2. The computer-implemented method of claim 1, wherein the session data is sent to the electronic device as part of an encrypted token.

3. A computer-implemented method comprising:
receiving a first request to create a first session with a provider network, the first request including a first one or more attributes and an identification of a role to assume for the first session, wherein the first one or more attributes include a user-specified session tag to affect resource permissions of the session with the provider network;
generating first session data including the user-specified session tag, wherein generating first session data includes replacing a value of another attribute with a value of the user-specified session tag, wherein the other attribute is at least one of a first attribute specified in an identity provider credential included with the first request or a second attribute associated with the role via a role object stored in the provider network, and wherein the user-specified session tag and the other attribute share a key name;
receiving a second request to access a resource hosted by the provider network;
obtaining the user-specified session tag from the first session data based at least in part on the second request; and
permitting the second request based at least in part on the user-specified session tag obtained from the first session data.

4. The computer-implemented method of claim 3, wherein the first request further includes authentication data; and
authenticating the first request based at least in part on the authentication data.

5. The computer-implemented method of claim 3, wherein the second request includes an encrypted token that contains the user-specified session tag, and wherein the obtaining the user-specified session tag from the first session data based at least in part on the second request comprises decrypting the encrypted token to extract the user-specified session tag.

6. The computer-implemented method of claim 3, wherein the second request includes an identifier of the first session data, and wherein the obtaining the user-specified session tag from the first session data based at least in part on the second request comprises retrieving the first session data from a session data store based on the identifier.

7. The computer-implemented method of claim 3, further comprising:
permitting the first request based at least in part on an evaluation of a first rule with at least one attribute of the first one or more attributes, wherein the first rule is part of a first set of rules that govern whether the role can be assumed, and
wherein the first set of rules include a rule identifying a set of necessary attributes that must be included with a request to assume the role, wherein metadata associates the role to the first rule.

8. The computer-implemented method of claim 7, further comprising:
receiving a third request to create a second session with the provider network, the third request including a third one or more attributes and an identification of a role to assume for the second session; and
denying the third request based at least in part on an absence of at least one attribute identified in the set of necessary attributes in the third one or more attributes.

9. The computer-implemented method of claim 7, wherein the first set of rules include a rule identifying a set of attributes that cannot be user-specified.

10. The computer-implemented method of claim 9, further comprising:
receiving a third request to create a second session with the provider network, the third request including a third one or more attributes and an identification of a role to assume for the second session, the third one or more attributes including a second user-specified session tag to affect resource permissions of the session with the provider network; and
denying the third request based at least in part on a presence of the second user-specified session tag, wherein the second user-specified session tag shares a key name with at least one attribute identified in the set of attributes that cannot be user-specified.

11. The computer-implemented method of claim 3, further comprising:
receiving a third request to create a second session with the provider network, the third request including a reference to the first session data and an identification of another role to assume for the second session;
permitting the third request based at least in part on an evaluation of another role trust policy associated with the other role; and
generating second session data including the user-specified session tag from the first session data.

12. The computer-implemented method of claim 3, further comprising:
permitting the second request based at least in part on evaluation of a first rule with at least the user-specified session tag, wherein the first rule is part of a first set of rules that govern whether the action can be performed, and
wherein the evaluation of the first rule with at least the user-specified session tag includes matching a value of the user-specified session tag with a value of another attribute associated with the resource.

13. A system comprising:
a first one or more electronic devices implementing an access control service, the access control service including instructions that upon execution cause the first one or more electronic devices to:
receive a first request to create a first session with a provider network, the first request including a first one or more attributes and an identification of a role to assume for the first session, wherein the first one or more attributes include a user-specified session tag to affect resource permissions of the session with the provider network; and
generate first session data including the user-specified session tag, wherein to generate first session data includes replacing a value of another attribute with a value of the user-specified session tag, wherein the other attribute is at least one of a first attribute specified in an identity provider credential included with the first request or a second attribute associated with the role via a role object stored in the provider network, and wherein the user-specified session tag and the other attribute share a key name;

a second one or more electronic devices implementing a resource interface, the resource interface including instructions that upon execution cause the second one or more electronic devices to:

receive a second request to access a resource hosted by the provider network;

obtain the user-specified session tag from the first session data based at least in part on the second request; and permit the second request based at least in part on the user-specified session tag obtained from the first session data.

14. The system of claim 13, wherein the first request further includes authentication data; and authenticating the first request based at least in part on the authentication data.

15. The system of claim 13, wherein the second request includes an encrypted token that contains the user-specified session tag, and wherein the obtaining the user-specified session tag from the first session data based at least in part on the second request comprises decrypting the encrypted token to extract the user-specified session tag.

16. The system of claim 13, wherein the second request includes an identifier of the first session data, and wherein the obtaining the user-specified session tag from the first session data based at least in part on the second request comprises retrieving the first session data from a session data store based on the identifier.

17. The system of claim 13, wherein the access control service includes further instructions that upon execution cause the first one or more electronic devices to:

permit the first request based at least in part on an evaluation of a first rule with at least one attribute of the first one or more attributes, wherein the first rule is part of a first set of rules that govern whether the role can be assumed, and wherein the first set of rules include a rule identifying a set of necessary attributes that must be included with a request to assume the role, wherein metadata associates the role to the first rule.

* * * * *